United States Patent [19]

Bielli et al.

[11] 4,336,542
[45] Jun. 22, 1982

[54] METHOD OF AND SYSTEM FOR TRACKING AN OBJECT RADIATING A CIRCULARLY OR LINEARLY POLARIZED ELECTROMAGNETIC SIGNAL

[75] Inventors: Paolo Bielli, Cirie-Torino; Salvatore De Padova; Dario Savini, both of Turin, all of Italy

[73] Assignee: CSELT, Centro Studi e Laboratori Telecomunicazioni S.p.A., Turin, Italy

[21] Appl. No.: 90,618

[22] Filed: Nov. 2, 1979

[30] Foreign Application Priority Data

Nov. 6, 1978 [IT] Italy ............................ 69540 A/78

[51] Int. Cl.³ ............................................ H04B 7/00
[52] U.S. Cl. ........................ 343/100 PE; 343/100 ST
[58] Field of Search .................... 343/100 PE, 100 ST

[56] References Cited

U.S. PATENT DOCUMENTS 3,540,045  1/1969  Taylor .......................... 343/100 PE Primary Examiner—Theodore M. Blum Attorney, Agent, or Firm—Karl F. Ross

[57] ABSTRACT

To track an object such as a space probe or a satellite emitting an electromagnetic radio signal, the signal received at a ground antenna is passed through a circular waveguide section propagating modes $TE_{11}$ and $TE_{21}$. Polarized signal components of the higher $TE_{21}$ mode are extracted from the waveguide through two pairs of lateral slots and their differences are multiplied by an r-f reference signal of the same frequency obtained from a preamplifier coupled to an output port to which the signal of mode $TE_{11}$ is transmitted by way of a rotatable polarization changer. Corrective signals resulting from these multiplications are proportional to spatial coordinates of the tracked object in a predetermined Cartesian system, one of whose axes coincides with that of the waveguide section, and serve to keep the antenna trained upon the object. The polarization changer is rotated until the signal power available at the output port is a maximum, a corresponding rotation being imparted in the case of a linearly polarized radio signal to the circular waveguide section.

8 Claims, 4 Drawing Figures

4,336,542

METHOD OF AND SYSTEM FOR TRACKING AN OBJECT RADIATING A CIRCULARLY OR LINEARLY POLARIZED ELECTROMAGNETIC SIGNAL

FIELD OF THE INVENTION

Our present invention relates to the positioning of directional antennas and, more particularly, to a method of and a system for tracking an object radiating an electromagnetic signal which may have either linear or circular polarization (radio beacon).

BACKGROUND OF THE INVENTION

It is known that in order to communicate with a mobile automatic station, for instance a meteorologic satellite, a communication satellite or a space probe, the ground-station antenna must constantly point in the direction of the object in motion, following all its movements. To facilitate this task, a radio-wave generator or radio beacon is placed aboard the automatic station; the beacon, by constantly radiating an electromagnetic signal toward the various stations spread over the earth's surface, allows them to position their antennas. This operation, generally referred to as "tracking", is automatically performed so as to ensure reliable operation at any time.

For this purpose, the ground stations are equipped with autotrack systems allowing to keep the direction of maximum reception of the antennas coincident with the direction of the beacon placed aboard the satellite.

This requirement is to be satisfied not only when the satellite is in motion with respect to the earth (non-geostationary satellite) but also when it is in an orbit in which it ought to be fixed with respect to the earth (geostationary satellite). In fact, the satellite is always under the gravitational forces exerted by the other celestial bodies of the solar system. The resultant of these forces causes an oscillation of the actual position of the satellite around its nominal position.

A radio-beacon tracking system must be able to detect these variations and therefore must send suitable corrective signals to the motors which position the antenna in both azimuth and elevation. These signals are obtained by duly extracting and processing the information relative both to the dominant propagation mode in the waveguide of the antenna feed and to the higher mode or modes corresponding to the configurations of the electromagnetic field that are generated owing to the pointing error.

The propagation modes to be utilized as well as the processing methods depend on the kind of polarization of the electromagnetic wave transmitted by the radio beacon. Thus, in satellites equipped with telecommunication apparatus operating in the range of frequencies from 4 to 6 GHz, communication radio beams as well as radio-beacon signals utilize circular polarization. A tracking system which extracts the error signals from the propagation mode $TM_{01}$ in the guide has been already developed for such satellites.

For satellites equipped with telecommunication apparatus operating at frequencies higher than 10 GHz, the general trend is toward the use of signals radiated by linear polarization; for these signals the tracking system used so far for circularly polarized radio beacons is no longer suitable.

Present requirements are for tracking systems designed for linear polarization only, or for both linear and circular polarization. Of course, the latter systems are more in demand as they can be utilized indifferently with ground antennas operating in networks of links via satellite with circularly or linearly polarized radio beacons.

Conventional tracking systems suitable for both kinds of polarization can be basically grouped into two families: the first comprises systems in which the error signals are obtained from information associated with several higher modes in addition to the dominant one; the second comprises systems utilizing one higher mode only.

More particularly, the second family comprises systems utilizing the waveguide propagation mode $TE_{21}$.

The solutions utilizing several higher modes are more complicated, because they require different kinds of mode couplers and because the processing necessary to extract error signals is more involved; furthermore, the overall adjustment of the equipment is more critical.

In the cases in which the tracking system utilizes only the mode $TE_{21}$, a problem to be solved arises from the fact that the direction of the electromagnetic field radiated by radio beacons with linear polarization is different in the various zones of the earth. The known technical solutions can face these difficulties by means of expensive and sophisticated methods of processing radio-frequency signals.

OBJECTS OF THE INVENTION

An object of our present invention is to provide an improved tracking system and method for radio beacons with circular or linear polarization, utilizing only one higher mode of propagation in a waveguide in order to extract the antenna-positioning signals, designed to solve in a very simple manner the problem presented by the different orientation of the linearly polarized electromagnetic field at various points of the earth's surface.

A related object is to provide a method and system of this character which will not perturb the radio-frequency chain where the information signal propagates, requiring no sophisticated radio-frequency processing of the received signals which could give rise to errors that cannot be distinguished from the actual pointing errors.

SUMMARY OF THE INVENTION

We realize this object, pursuant to our present invention, by passing a received radio signal from a remote object—such as a space probe or a satellite—through a circular waveguide section capable of propagating both the fundamental mode $TE_{11}$ and the higher mode $TE_{21}$, extracting signal components of mode $TE_{21}$ from that waveguide section via two pairs of diametrically opposite lateral slots located in axial planes mutually offset by 45° while transmitting a signal wave of mode $TE_{11}$ to an output port of a waveguide structure of which the circular section forms part, subtractively combining the signal components extracted from each pair of slots to form a first and a second difference signal, obtaining a reference signal of the same frequency as the difference signals from the signal wave of mode $TE_{11}$ arriving at the output port of the waveguide structure, and multiplying each difference signal by the reference signal so obtained to produce a pair of output signals that are proportional to spatial coordinates of the tracked object in a predetermined Cartesian system having an axis coinciding with that of the slotted waveguide section which also constitutes the boresight axis of the antenna intercepting the incoming radio signal.

In accordance with a more particular feature of our invention, applicable when the received radio signal is linearly polarized, the plane of polarization of the signal wave of mode $TE_{11}$ traveling through the waveguide structure is rotated—manually or otherwise—until the signal power at the output is a maximum. At the same time, for reasons explained hereinafter, the slotted waveguide section is rotated into a position in which the plane of one slot pair includes with a reference plane an angle equal to the angle of rotation undergone by the plane of polarization, that reference plane containing the boresight axis and one other axis of the aforementioned Cartesian coordinate system.

For this purpose, a tracking system according to our invention advantageously comprises a polarization changer designed as a 180° rotator and inserted in the waveguide structure between the rotatable slotted section and the output port. The rotation of that waveguide section is preferably performed automatically by a servo drive responsive to the rotation of the polarization changer. We also prefer to insert a 90° phase shifter in the waveguide structure upstream of the polarization rotator so that the latter will see a linearly polarized signal even when the incoming radio wave is circularly polarized. In the latter event, however, the servo drive for the rotatable waveguide section should be deactivated.

BRIEF DESCRIPTION OF THE DRAWING

The above and other features of our invention will now be described in detail with reference to the accompanying drawing in which.

SPECIFIC DESCRIPTION

Figure 1:
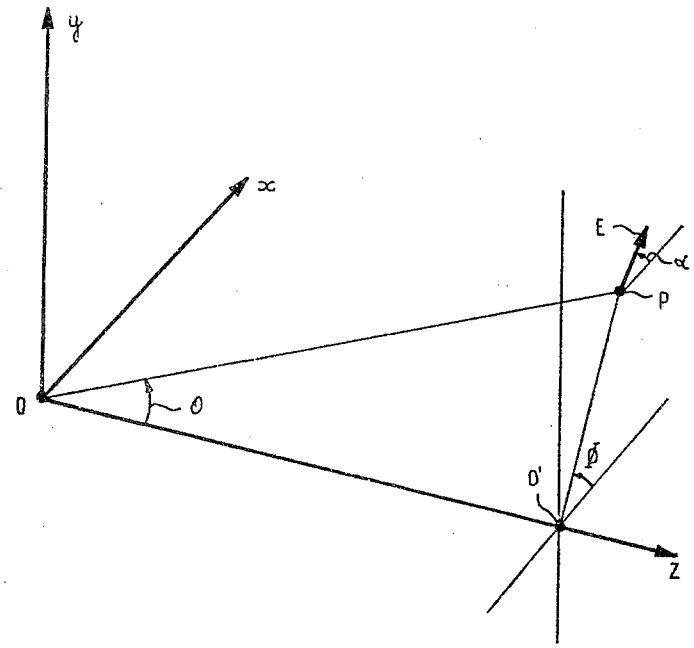
FIG. 1 is a representation of the reference system as well as of the geometric parameters defining the position of a radio beacon and the polarization plane of the electrical field in a communication system operating with linear polarization.

FIG. 1 is a perspective view of a reference system capable of defining the geometrical parameters identifying the instantaneous locations of a ground antenna and of a radio beacon. These parameters are a necessary support for the following theoretical exposition on the basic principles giving rise to the methodology used for the tracking system of our invention.

References x, y, z denote the axes of an orthogonal Cartesian base, integral with the ground antenna located at the origin O; axis z coincides with the direction of maximum efficiency of the ground antenna, referred to in the art as the boresight axis.

This Cartesian base is associated with a base of spherical coordinates $\theta$ and $\Phi$ by means of which the angular position of the radio beacon, denoted by P, can be more readily detected.

Angle $\theta$ is included between axis z and line segment OP, whereas angle $\Phi$ is defined by plane xz and plane OPO' where O' is the intersection point of axis z with a plane parallel to plane xy passing through point P. The length of line segment OP is not critical for the description of the system.

Reference E denotes the vector of the electric field radiated by the radio beacon, in case of linear polarization; reference $\alpha$ denotes the angle included between the polarization plane of the electrical field and a plane parallel to plane xz passing through point P. It is clear that the antenna pointing is perfect when point P coincides with point O' so as to lie on axis z representing the direction of maximum reception of the antenna.

Figure 2:
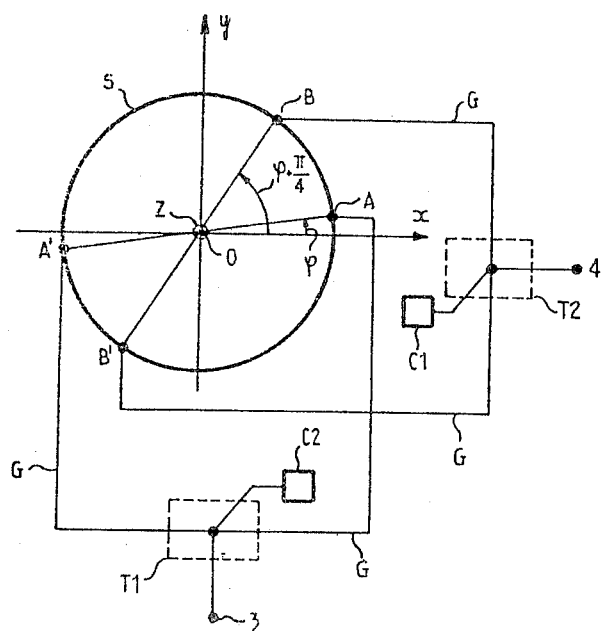
FIG. 2 is a schematic representation of a system for extracting the information associated with mode $TE_{21}$.

FIG. 2 is a schematic representation of a signal extractor forming part of the ground antenna. This Figure shows the same orthogonal reference system x, y, z with the positive half-axis z projecting from the drawing plane toward the observer.

Origin O of the reference system coincides with the center of a section S of a circular waveguide forming part of the antenna feed. The guide has a diameter that allows propagation of modes $TE_{11}$ and $TE_{21}$ at the radio-beacon frequency. References A, A', B, B' denote four slots with their major dimension parallel to the axis z of the circular waveguide from which also the information associated with the higher propagation mode $TE_{21}$ is extracted. As previously mentioned, this mode is originated in the waveguide when the signal emitted by the radio beacon deviates from the nominal pointing direction of the ground antenna. Slots A and A', as well as slots B and B', are diametrically opposite each other with respect to the axis of the guide. The two slot pairs A, A' and B, B' lie in axial planes of the waveguide including an angle of $\pi/4$ between them; the plane of pair A, A' includes with plane xz a generic angle $\phi$.

For practical reasons, the two pairs of slots A, A' and B, B' are cut in two different cross-sections of the guide. However, the distance between these sections is such that the arrangement is electrically equivalent to the theoretical case in which the sections coincide, as they have been represented in the drawing.

Signals associated both with the dominant mode $TE_{11}$ and with the higher mode $TE_{21}$ come from the pairs of slots A, A' and B, B'. By sending these signals two by two through a waveguide G to two "magic T" circuits T1 and T2, we obtain at their "difference" outputs 3 and 4 for small angles $\theta$ two signals $u_{1l}$ and $u_{2l}$ (linear polarization) or $u_{1c}$ and $u_{2c}$ (circular polarization) relevant only to mode $TE_{21}$. The two pairs of signals are given by:

$$u_{1l} = -K_1 \theta \cos(\Phi - 2\phi + \alpha) \cos(\omega t + \delta) \quad (1)$$

$$u_{2l} = K_1 \theta \sin(\Phi - 2\phi + \alpha) \cos(\omega t + \delta)$$

in case of linear polarization, and $$u_{1c} = -K_2 \theta \cos(\omega t + \Phi - 2\phi + \gamma) \quad (2)$$

$$u_{2c} = -K_2 \theta \sin(\omega t + \Phi - 2\phi + \gamma)$$

in case of circular polarization.

$K_1$ and $K_2$ are two multiplicative constants dependent on the extraction characteristics; $\delta$ and $\gamma$ are two generic reference phases.

Analogously, at the "sum" outputs of the two "magic T" circuits there is available only the information associated with the dominant mode $TE_{11}$. As this information is generally extracted at an output port of the waveguide structure coupled to a radio-frequency preamplifier where the power level is higher, the "sum" outputs are so terminated in two suitable loads C1 and C2 that the extracting slots do not disturb the dominant propagation mode $TE_{11}$.

The signals present at the "difference" outputs, as expressed by equations (1) and (2), are now multiplied by reference signals of the same pulsatance $\omega$ (termed isofrequential signals hereinafter) given by:

$$u_{rl} = \cos(\omega t + \delta) \tag{3}$$

in case of linear polarization, and $$u_{rc} = \cos(\omega t - 2\phi + \pi/2 + \gamma) \tag{4}$$

in case of circular polarization.

Thus, corrective signals conforming to the following expressions are obtained:

$$u_1' = -K_1'\theta \sin(\Phi - 2\phi + \alpha) \tag{5}$$

$$u_2' = K_1'\theta \cos(\Phi - 2\phi + \alpha)$$

for the linear polarization, and $$u_{1c}' = -K_2'\theta \sin \Phi \tag{6}$$

$$u_{2c}' = K_2'\theta \cos \Phi$$

for the circular polarization.

$K_1'$ and $K_2'$ are multiplicative constants.

For the linear polarization, in case angle $\phi$ takes the value $$\phi = \alpha/2, \tag{7}$$

the signals of expressions (5) become:

$$u_{1l}' = -K_1'\theta \sin \Phi \tag{8}$$

$$u_{2l} = K_1'\theta \cos \Phi$$

Expressions (6) and (8), for small values of $\theta$ and apart from a scale factor, represent the very Cartesian coordinates $x_P$ and $y_P$ of point P (FIG. 1), where the radio beacon resides, with respect to the orthogonal Cartesian base integral with the ground antenna (the coordinate $z_P$ denotes the distance of the ground station from the radio beacon, thus it is not important in tracking problems). In addition, coordinates $x_P$ and $y_P$ represent the movements the antenna must undergo to make its boreright axis coincide with the radio-beacon direction.

In case the polarization is not perfectly circular but slightly elliptical, the corrective signals coming from the tracking system are still capable of directly driving the antenna to the pointing direction, without any oscillation about the correct position. If, on the other hand, the nominally linear polarization is slightly elliptical, the corrective signals may be purified from possible errors, as will be seen later in greater detail.

From these theoretical statements it will be apparent that it is possible to realize a tracking system, for radio beacons having both linear and circular polarization, by utilizing only information associated with mode $TE_{21}$, provided the signals are extracted from pairs of slots located in planes including an angle of $\pi/4$ between them, and provided conditions (3) and (7) for linear polarization and condition (4) for circular polarization are satisfied.

Figure 3:
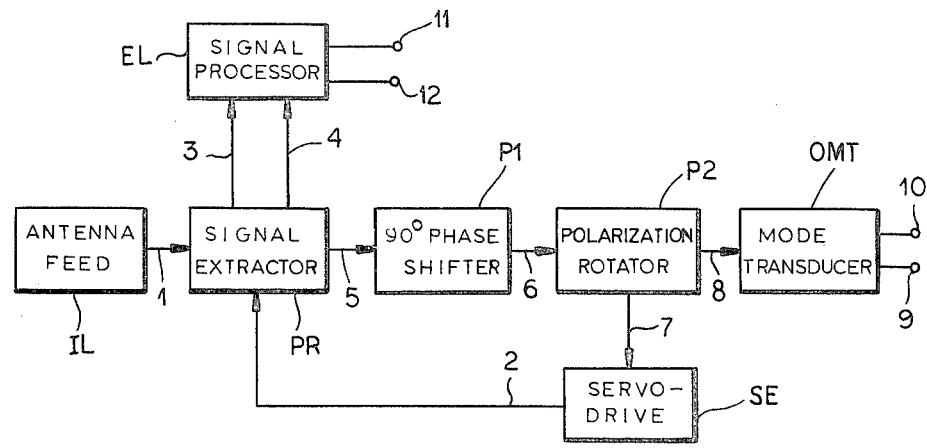
FIG. 3 is a block diagram of a tracking system according to our invention.

A tracking system able to meet the described requirements is depicted by a block diagram in FIG. 3. In the following description, reference will be made only to the operation of reception, the duality principle making that description also applicable to transmission. The radio-beacon signal coming from the satellite enters the feed IL of the ground antenna and, through a waveguide section 1, is sent to a block PR representing a signal extractor basically realized as in FIG. 2. Thus, extractor PR comprises a circular guide, dimensioned to allow the propagation of higher mode $TE_{21}$, in which two pairs of longitudinal slots are cut in respective axial planes offset by $\pi/4$ from one another, as described above.

The axial distance between the pairs of slots is about equal to $\lambda_g/2$, where $\lambda_g$ is the guide wavelength of mode $TE_{21}$. In this way, as is known, the two pairs of slots behave as though they were in the same section with respect to the electromagnetic-field configuration of the $TE_{21}$ mode while the positioning of the output guides is simplified.

The extracted signal components are combined by means of "magic T" circuits, as previously described, and are then transferred, already in the form given by relationships (1) and (2), to the inputs of a processor EL through waveguides 3 and 4.

The signal associated with the dominant mode $TE_{11}$ is transferred, by means of a transition to a circular waveguide 5 of different diameter, to a phase shifter P1 and then through a guide 6 to a polarization rotator P2. From there the signal passes through a guide 8 to a mode transducer OMT emitting it via a port 9 to the subsequent receiver stages. Another port 10 is the entrance for signals coming from an associated transmitter.

The position of mode transducer OMT, fixed with respect to the components PR and P2 which are free to rotate about a line coinciding with the axes of the guides, is suitably chosen during installation. More particularly, the respective polarization vectors of the signals present at ports 9 and 10 must be parallel to the axes x and y of the reference system shown in FIG. 1. This reference system will in turn be so chosen that axes x and y respectively coincide with the nominal directions of horizontal and vertical polarization associated with the radio beacon.

If the received signal has circular polarization, the 90° phase shifter converts it into linear polarization, whereas in case of linear polarization this phase shifter must be so placed as not to affect the polarization direction of the signal.

As the incoming signal has now invariably a linear polarization, rotator P2 can be so positioned as to cause the polarization vector of that signal to revert at its its junction with guide 8 to a direction corresponding to that required at the input of mode transducer OMT. When this is done, a maximum power transfer is obtained. As is known, in order to rotate the plane of polarization of the incident signal by an angle $\alpha$, when the nominal polarization coincides with axis x as in the example depicted in FIG. 1, rotator P2 of FIG. 3 must be rotated by an angle $\beta$ equal to $\alpha/2$. According to relationship (7), it is necessary to offset the plane of slots A, A' of FIG. 2 from axis x by an angle $\phi$ exactly equal to $\alpha/2$ and thus to $\beta$ in order to avoid error contributions at the outputs of block PR (FIG. 3) connected to guides 3 and 4.

Another block SE is a servo-drive mechanism, of mechanical or electromechanical type, which receives through a connection 7 the information relating to the rotation β of polarization changer P2 and converts it into a rotation command which it sends to block PR through a connection 2. The rotator P2 can be operated either manually or through local or remote electric control. Obviously the servo-drive mechanism SE is deactivated with a circularly polarized radio beacon.

Component EL of FIG. 3 will now be described in connection with the detailed block diagram of FIG. 4. This component, serving to process the extracted signals, has a partly conventional structure which is here briefly summarized for a more complete disclosure of the tracking system embodying our invention. As will be apparent from the drawing, the structure of this processor is perfectly symmetrical with respect to a horizontal median line, wherefore we shall limit the following description to its upper half.

The radio-frequency signal $u_{1l}$ or $u_{1c}$ defined in relationship (1) or (2) appears at port 3 and is amplified through a suitable amplifier A1; it is then transposed to a suitable intermediate frequency through a heterodyning converter M1 that receives the radio-beacon signal from a waveguide 19 and the output signal of a local oscillator OL from a guide 14 and sends the resulting i-f signal, through a connection in a coaxial cable 20, to a second amplifier A2. The amplified signal is sent through a connection 21 to another converter M2 for being multiplied by an isofrequential signal $u_{rl}$ or $u_{rc}$, defined in relationship (3) or (4), present on a connection 17. A corrective signal $u_{1l}'$ or $u_{1c}'$ according to equation (5) or (6) is thus present at the output of converter M2 on a part 11.

The isofrequential reference signal on connection 17 is derived via a heterodyning converter M5 from the radio-frequency signal extracted by means of a connection 13 downstream of a low-noise preamplifier PA of the receiver fed by the port 9 of FIG. 3. This reference signal is multiplied in converter M5 by the output signal of local oscillator OL so as to maintain the equality of the intermediate frequencies on conductors 21 and 17.

A conventional power divider DP splits the power of the intermediate-frequency signal from converter M5, arriving over a connection 16, into two equal parts on two branches 15 and 18.

The output signal of divider DP reaches a variable phase shifter S1 which, during the tuning of the system, emits at output 11 the required signal $u_{1c}''$ or $u_{1c}'$, thus realizing the phase conditions expressed in relationships (3) and (4).

Figure 4:
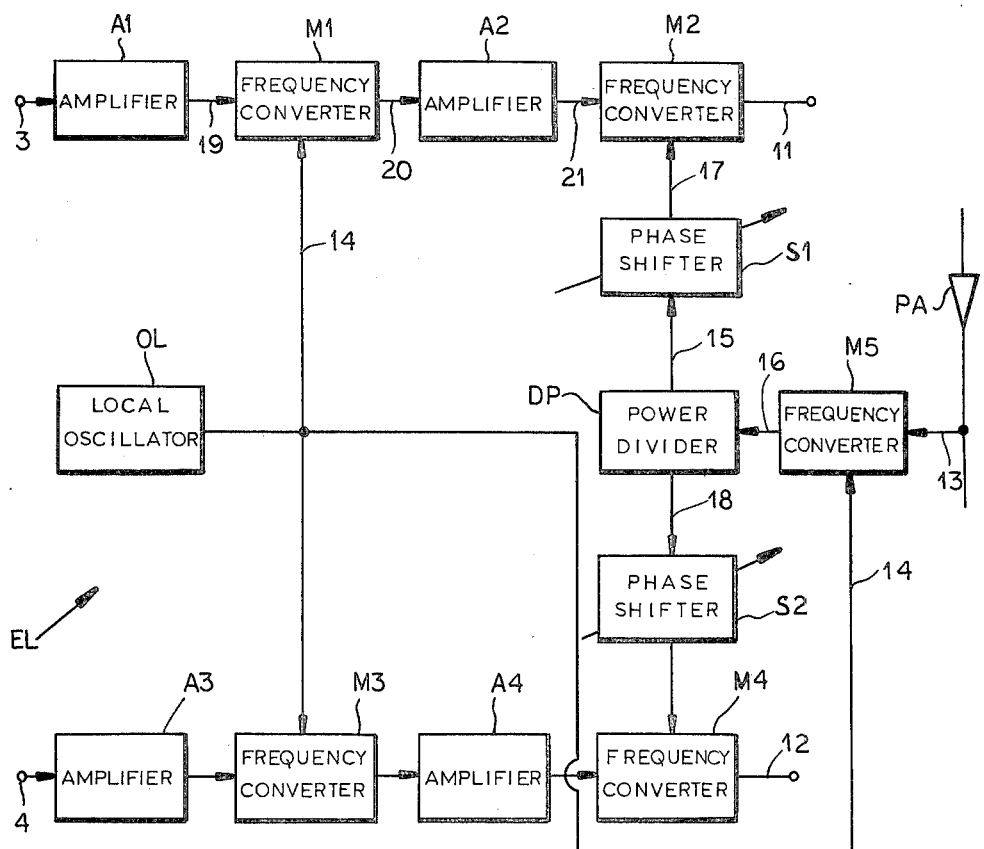
FIG. 4 is a detailed block diagram of a signal processor included in the system of FIG. 3.

As to the lower half of the circuitry depicted in FIG. 4, blocks A3, M3, A4, M4, S2 correspond respectively to the above-described blocks A1, M1, A2, M2, S1 as to both structure and operation. References 4 and 12 denote the input and output ports as in FIG. 3.

We claim:

1. A method of tracking a remote object emitting an electromagnetic radio signal, comprising the steps of:
   receiving the emitted radio signal and passing same through a circular waveguide section capable of propagating modes $TE_{11}$ and $TE_{21}$;
   extracting signal components of mode $TE_{21}$ from said waveguide section via two pairs of diametrically opposite lateral slots located in axial planes mutually offset by 45° while transmitting a signal wave of mode $TE_{11}$ to an output port;
   subtractively combining the signal component extracted from each pair of slots to form a first and a second difference signal;
   obtaining from the signal of mode $TE_{11}$ arriving at said output port a reference signal of the same frequency as said difference signals; and
   multiplying each of said difference signals by said reference signal to produce a pair of output signals proportional to spatial coordinates of said object in a predetermined Cartesian system having an axis coinciding with that of said waveguide section.

2. A method as defined in claim 1 wherein said received radio signal is linearly polarized, comprising the further steps of:
   rotating the plane of polarization of signals wave of mode $TE_{11}$ until a maximum signal power is obtained at said output port; and
   rotating said waveguide section into a position in which the plane of one of said pairs of slots includes with a reference plane, containing the axis of said waveguide section and one other axis of said Cartesian system, an angle equal to the angle of rotation undergone by said plane of polarization.

3. A method as defined in claim 1 or 2, comprising the further step of transposing said difference signals and said reference signal to a common intermediate frequency before multiplying same with each other.

4. A system for tracking a remote object emitting an electromagnetic radio signal, comprising:
   receiving means with an antenna for intercepting the emitted radio signal and waveguide means for conveying a fundamental mode $TE_{11}$ thereof to an output port, said waveguide means including a circular guide section capable of propagating a higher mode $TE_{21}$ of said radio signal besides said fundamental mode $TE_{11}$, said guide section being rotatable about a boresight axis of the antenna and being provided with two pairs of diametrically opposite lateral slots lying in axial planes offset by 45° from each other;
   first and second connections extending from said pairs of slots for subtractively combining respective signal components of said mode $TE_{21}$ into a pair of difference signals;
   circuit means coupled to said output port for obtaining an incoming signal from said mode $TE_{11}$ and deriving therefrom a reference signal of the same frequency as said difference signals; and
   frequency-converting means joined to said connections and to said circuit means for multiplying each of said difference signals by said reference signal, thereby producing two corrective signals usable to keep said boresight axis trained upon said object.

5. A system as defined in claim 4 wherein said waveguide means includes a rotatable polarization changer interposed between said guide section and said output port for rotating the plane of polarization of a linearly polarized radio signal of mode $TE_{11}$ until a maximum signal power is obtained at said output port, said guide section being rotatable about said boresight axis conjointly with said phase shifter.

6. A system as defined in claim 5, further comprising a servo drive responsive to rotation of said polarization changer for imparting a correlated rotation to said guide section.

7. A system as defined in claim 6, further comprising a 90° phase shifter inserted in said waveguide means between said guide section and said polarization changer for converting a circularly polarized radio signal of mode $TE_{11}$ into a linearly polarized one, said servo drive being deactivable in the presence of said circularly polarized signal.

8. A system as defined in claim 4, 5, 6 or 7, further comprising heterodyning means including a local oscillator for transposing said difference signals and said reference signal to a common intermediate frequency before multiplying same in said frequency-converting means.

* * * * *